(12) United States Patent
Kim

(10) Patent No.: US 9,104,536 B2
(45) Date of Patent: Aug. 11, 2015

(54) METHOD FOR SAMPLING MONITORING DATA OF CONSTRUCTION EQUIPMENT

(75) Inventor: Jae Hoon Kim, Gyeonggi-do (KR)

(73) Assignee: Doosan Infracore Co., Ltd., Incheon (KR)

( * ) Notice: Subject to any disclaimer, the term of this patent is extended or adjusted under 35 U.S.C. 154(b) by 0 days.

(21) Appl. No.: 13/882,879

(22) PCT Filed: Nov. 1, 2011

(86) PCT No.: PCT/KR2011/008245
§ 371 (c)(1), (2), (4) Date: May 1, 2013

(87) PCT Pub. No.: WO2012/060606
PCT Pub. Date: May 10, 2012

(65) Prior Publication Data
US 2013/0218370 A1    Aug. 22, 2013

(30) Foreign Application Priority Data

Nov. 1, 2010  (KR) .................. 10-2010-0107590

(51) Int. Cl.
*G06F 7/00*     (2006.01)
*G06F 19/00*    (2011.01)
(Continued)

(52) U.S. Cl.
CPC .............. *G06F 17/00* (2013.01); *E02F 9/2054* (2013.01); *E02F 9/267* (2013.01)

(58) Field of Classification Search
CPC ... B60G 17/0195; G08C 15/00; E02F 9/2054; E02F 9/267; E02F 9/26; G06F 17/00
USPC ............ 701/1, 50, 29, 30, 32–35, 29.4, 30.4, 701/30.5, 30.6
See application file for complete search history.

(56) References Cited

U.S. PATENT DOCUMENTS 4,142,238 A * 2/1979 Brandt et al. .................. 702/176
5,977,743 A * 11/1999 Flock ............................ 318/811
(Continued)

FOREIGN PATENT DOCUMENTS

| CN | 1191594 | 8/1998 |
|----|---------|--------|
| CN | 101189103 | 5/2008 |

(Continued)

OTHER PUBLICATIONS

Search Report dated May 7, 2012 and written in Korean with English translation attached for International Application No. PCT/KR2011/008245 filed Nov. 1, 2011, 5 pages.
(Continued)

*Primary Examiner* — Fadey Jabr
*Assistant Examiner* — Angelina Shudy
(74) *Attorney, Agent, or Firm* — John D. Veldhuis-Kroeze; Westman, Champlin & Koehler, P.A.

(57) ABSTRACT

A method of sampling monitoring data of construction equipment according to the present disclosure includes: setting a sampling cycle of the monitoring data of the construction equipment when the construction equipment enters into an operation; sampling the monitoring data of the construction equipment according to the sampling cycle when a sampling start is input; and storing the sampled data and transmitting consecutive sampling data to a remote management server when a total sampling time elapses.

4 Claims, 3 Drawing Sheets

(51) Int. Cl.
*G06F 17/00* (2006.01)
*E02F 9/20* (2006.01)
*E02F 9/26* (2006.01)

(56) References Cited

U.S. PATENT DOCUMENTS

| | | | |
|---|---|---|---|
| 6,336,067 B1 * | 1/2002 | Watanabe et al. | 701/50 |
| 6,339,737 B1 * | 1/2002 | Yoshimura et al. | 701/50 |
| 6,496,766 B1 * | 12/2002 | Bernold et al. | 701/50 |
| 7,631,495 B2 * | 12/2009 | Naruse | 60/426 |
| 8,275,576 B2 * | 9/2012 | Furem et al. | 702/182 |
| 8,412,425 B2 * | 4/2013 | Katrak et al. | 701/63 |
| 2002/0032511 A1 * | 3/2002 | Murakami et al. | 701/50 |
| 2005/0171649 A1 * | 8/2005 | Adachi | 701/1 |
| 2006/0212203 A1 * | 9/2006 | Furuno | 701/50 |
| 2008/0080470 A1 * | 4/2008 | Yano et al. | 370/342 |
| 2008/0201108 A1 * | 8/2008 | Furem et al. | 702/182 |
| 2009/0228176 A1 * | 9/2009 | Mintah et al. | 701/50 |
| 2009/0228394 A1 * | 9/2009 | Mintah et al. | 705/50 |
| 2010/0141436 A1 * | 6/2010 | Morita et al. | 340/539.22 |
| 2010/0219992 A1 * | 9/2010 | Rohatschek | 341/76 |
| 2010/0307825 A1 * | 12/2010 | Siepi | 175/45 |
| 2011/0002362 A1 * | 1/2011 | Michaels et al. | 375/138 |
| 2011/0241904 A1 * | 10/2011 | Cho | 340/989 |
| 2011/0273978 A1 * | 11/2011 | Murayama et al. | 370/216 |
| 2011/0320079 A1 * | 12/2011 | Yasuda | 701/22 |
| 2012/0290168 A1 * | 11/2012 | De et al. | 701/30.2 |
| 2014/0277832 A1 * | 9/2014 | Bando et al. | 701/1 |
| 2014/0309805 A1 * | 10/2014 | Ricci | 701/1 |

FOREIGN PATENT DOCUMENTS

| | | | |
|---|---|---|---|
| CN | 102175269 A * | 9/2011 | |
| JP | 2008-180024 A | 8/2008 | |
| JP | 2011120385 A * | 6/2011 | |
| KR | 10-2010-0059309 A | 6/2010 | |
| KR | 20100059309 A * | 6/2010 | |
| KR | 1020100059309 | 6/2010 | |
| KR | 10-2010-0075307 A | 7/2010 | |

OTHER PUBLICATIONS

Office Action dated Jul. 31, 2014 issued in Chinese Patent Application No. 201180052515.0, 6 pages.

* cited by examiner

METHOD FOR SAMPLING MONITORING DATA OF CONSTRUCTION EQUIPMENT

This Application is a Section 371 National Stage Application of International Application No. PCT/KR2011/008245, filed Nov. 1, 2011 and published, not in English, as WO2012/060606 on May 10, 2012.

FIELD OF THE DISCLOSURE

The present disclosure relates to a method of sampling monitoring data of construction equipment, and more particularly, to a method of sampling monitoring data of construction equipment capable of monitoring the construction equipment by sampling various data related to the construction equipment desired to be monitored at a predetermined cycle and transmitting consecutive sampling data to a remote management server connected with the construction equipment through a communication network.

BACKGROUND OF THE DISCLOSURE

In general, when various information related to construction equipment, for example, data including location information, revolutions per minute (rpm) of an engine, a voltage of a battery, a temperature of a coolant, a temperature of oil, various switch on/off sensing information, on/off sensing information on a solenoid or a relay, proportional control valve current, pressure of a pump and a cylinder, a quantity of fuel, and a load factor, is desired to be consecutively sampled and monitored, sampling data is generally obtained by a method of establishing serial communication with a vehicle control device of the construction equipment or establishing a direction connection through a controller area network (CAN) for a vehicle.

However, in order to use the aforementioned method, it is necessary to visit a work area where the actual construction equipment is present, and if the work area is a remote area which it is difficult for a person to visit, a work stopping time of the construction equipment may be increased by a time taken for the visiting. Further, since a large amount of visiting expenses is consumed, an after service providing service for providing after service (A/S) of the construction equipment or an equipment manufacturing company has substantial inconvenience.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is conceived in order to solve the aforementioned problem, and one aspect of the present disclosure is to provide a method of capable of remotely monitoring construction equipment even though a supervisor of the construction equipment does not visit an actual work area.

A method of sampling monitoring data of construction equipment according to one aspect of the present disclosure includes: setting a sampling cycle of the monitoring data of the construction equipment when the construction equipment enters into an operation; sampling the monitoring data of the construction equipment according to the sampling cycle when a sampling start is input; and storing the sampled data and transmitting consecutive sampling data to a remote management server when a total sampling time elapses.

The sampling cycle may be automatically set based on an operational state of the construction equipment.

The method may further include: comparing the set sampling cycle and a vehicle communication transmission cycle of the construction equipment when the monitoring data of the construction equipment is generated in a separate control device, and when the sampling cycle is shorter than the vehicle communication transmission cycle, the vehicle communication transmission cycle may be applied at the sampling cycle, and when the sampling cycle is longer than the vehicle communication transmission cycle, the set sampling cycle may be applied without a change.

The operational state of the construction equipment may include a failure/working mode, a non-failure/working mode, a failure/driving mode, and a non-failure/driving mode, and the sampling cycle may be increased in an order of the failure/working mode, the non-failure/working mode, the failure/driving mode, and the non-failure/driving mode.

The method may further include: transmitting a sampling cycle and a total sampling time to the remote management server together with the consecutive sampling data; and consecutively displaying the consecutive sampling data on a display device in accordance with the received sampling cycle and total sampling time by the remote management server.

According to the aforementioned configuration of the present disclosure, a supervisor of the construction equipment receives the consecutive sampling data from the construction equipment without visiting an actual work area, thereby achieving an effect of capable of remotely monitoring the construction equipment.

Further, according to an aspect of the present disclosure, the monitoring data is sampled for each set cycle, in such a way that the consecutive sampling data is transmitted to the remote management server at a time point at which the total sampling time elapses, thereby achieving an effect that is capable of reducing a load of a monitoring device of the construction equipment and reducing expenses for transmitting the sampling data.

Further, according to an aspect of the present disclosure, the sampling cycle is automatically set based on an operational state of the construction equipment, thereby achieving an effect that is capable of decreasing inconvenience for a user of the construction equipment to set the sampling cycle considering each operational state of the construction equipment, and capable of precisely and accurately monitoring the construction equipment by setting optimum sampling according to each operational state.

Further, according to an aspect of the present disclosure, when the monitoring data is generated in a separate vehicle control device, a final sampling cycle is selected by comparing the set cycle with the vehicle communication transmission cycle, thereby achieving an effect that is capable of performing optimum sampling by handling various monitoring data generated in the construction equipment.

DETAILED DESCRIPTION

Hereinafter, an exemplary embodiment of the present disclosure will be described in detail with reference to the accompanying drawings.

Figure 1:
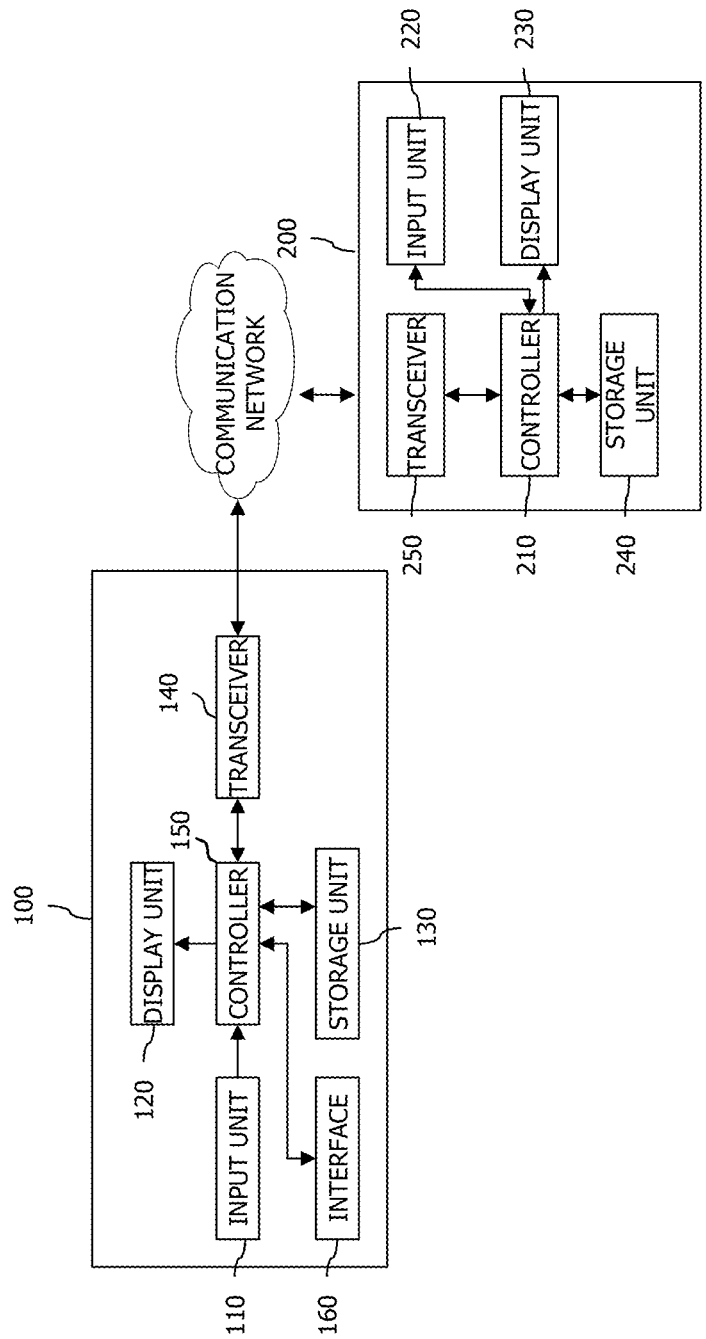
FIG. 1 is a schematic configuration diagram of a remote monitoring system of construction equipment according to the present disclosure.

FIG. 1 illustrates a schematic configuration of a remote monitoring system of construction equipment according to an exemplary embodiment of the present disclosure.

A remote monitoring system includes a monitoring device 100 for collecting and sampling monitoring data of construction equipment (not illustrated) to transmit consecutive sampling data to a remote management server 200, and the remote management server 200 for managing the construction equipment by receiving the consecutive sampling data from the monitoring device 100.

The monitoring device 100 includes an input unit 110, a display unit 120, a storage unit 130, a transceiver 140, a controller 150, and an interface 160.

The input unit 110 is used for setting a sampling cycle and a total sampling time of the construction equipment to be monitored by a worker of the construction equipment. Further, the input unit 110 is used for inputting a sampling start and end. The sampling cycle and the total sampling time set through the input unit 110 are transmitted to the controller 150 to be stored in the storage unit 130.

When the worker inputs a sampling start in the input unit 110, the display unit 120 displays an image indicating that the sampling currently progresses. The worker may identify a type of monitoring data and a sampling state of the construction equipment through the display unit 120.

The storage unit 130 stores data sampled for the total sampling time, that is, consecutive sampling data. The storage unit 130 stores the sampling cycle and the total sampling time input through the input unit 110 or automatically set by the controller 150.

When a time reaches the total sampling time, the transceiver 140 transmits the sampling data, the sampling cycle, and the total sampling time stored in the storage unit 130 to the remote management server 200 through a communication network (a mobile communication network or a satellite communication network).

The controller 150 controls a general operation of the monitoring device 100 of the construction equipment. The controller 150 samples the monitoring data input through the interface 160 for every predetermined sampling cycle, and stores the sampled data in the storage unit 130. The controller 150 may set the sampling cycle based on an operational state of the construction equipment. When the total sampling time elapses, the controller 150 fetches the consecutive sampling data stored in the storage unit 130 and transmits the fetched consecutive sampling data to the transceiver 140.

The interface 160 is connected to each component of the construction equipment to receive various monitoring data from the construction equipment. The monitoring data received through the interface 160 is transmitted to the controller 150.

Next, the remote management server 200 includes a controller 210, an input unit 220, a display unit 230, a storage unit 240, and a transceiver 250, similar to the monitoring device 100.

The transceiver 250 receives the consecutive sampling data, the sampling cycle, and the total sampling time transmitted from the monitoring device 100 of the construction equipment to provide the received consecutive sampling data, sampling cycle, and total sampling time to the controller 210. The controller 210 stores the received consecutive sampling data, sampling cycle, and total sampling time in the storage unit 240. Further, the controller 210 provides the consecutive sampling data, the sampling cycle, and the total sampling time to the display unit 230. The display unit 230 displays the consecutive sampling data in accordance with the sampling cycle and the total sampling time. The supervisor of the construction equipment monitors the construction equipment by identifying the sampling data through the display unit 230.

Figure 2:
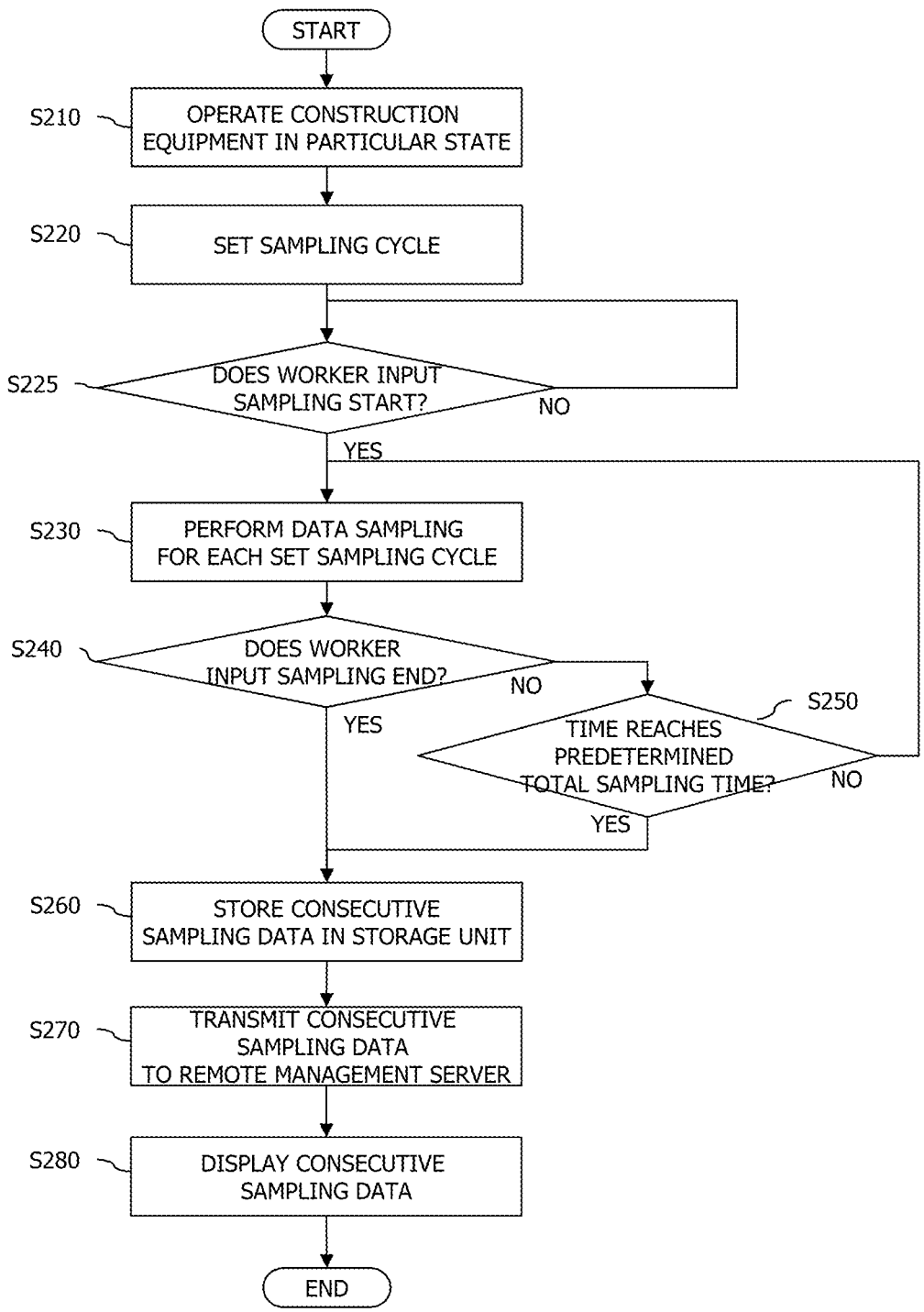
FIG. 2 is a flowchart for describing a method of sampling monitoring data of construction equipment according to the present disclosure.

FIG. 2 is a flowchart for describing a method of sampling the monitoring data of the construction equipment according to the present disclosure.

Referring to FIG. 2, a worker first operates the construction equipment desired to be monitored in a particular state (step S210). After the worker operates the construction equipment in the particular state, the worker sets the sampling cycle through the input unit 110 or the controller 150 automatically sets the sampling cycle according to an operational state of the construction equipment (step S220). When the sampling cycle is set, whether a sampling start is input is identified (step S225). When the worker inputs the sampling start, data sampling for the construction equipment to be monitored is performed for every predetermined sampling cycle (step S230).

Next, whether the worker directly inputs a sampling end in the input unit 110 is determined (step S240). When the sampling end is not input, whether a time reaches the total sampling time is determined (step S250). When the time does not reach the total sampling time, the process returns to step S230 to continuously perform the sampling.

When the worker inputs the sampling end through the input unit 110, the currently performed sampling is stopped while an image indicating the sampling end for the construction equipment to be monitored is displayed on the display unit 120, and the process proceeds to step S260. Further, even when the time reaches to the total sampling time, the process proceeds to step S260.

When the sampling end is input or the time reaches the total sampling time, the data sampled to a time point at which the sampling end is input or for the total sampling time is stored in the storage unit 130 (step S260). The sampled data stored in the storage unit 130 is referred to as consecutive sampling data.

When the consecutive sampling data is stored in the storage unit 130, the controller 150 transmits the consecutive sampling data to the transceiver 140, and the transceiver 140 transmits the consecutive sampling data to the remote management server 200 (step S270). The remote management server 200 receives the consecutive sampling data and displays the consecutive sampling data on the display unit 230 (step S280). The worker identifies the consecutive sampling data displayed through the display unit 230 to monitor the construction equipment.

Figure 3:
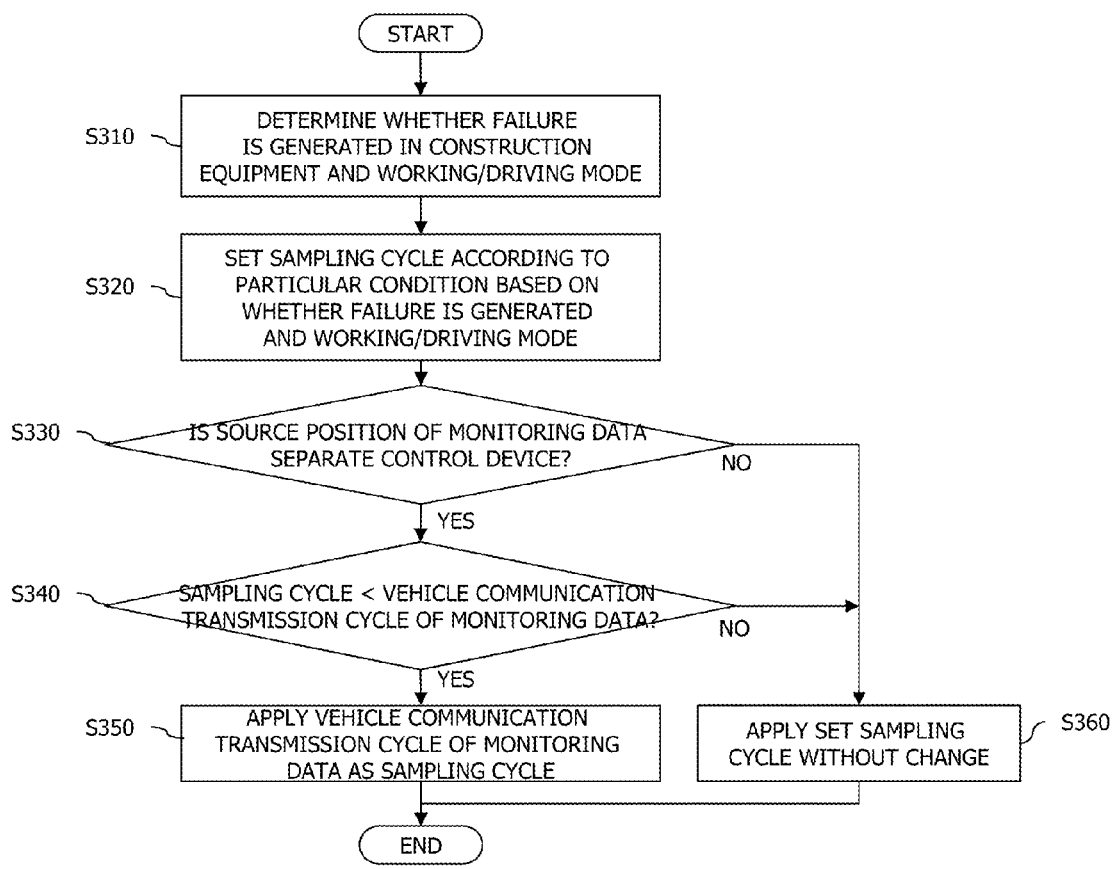
FIG. 3 is a flowchart for describing a method of automatically setting a sampling cycle according to the present disclosure.

FIG. 3 is a flowchart for describing a method of automatically setting the sampling cycle according to the present disclosure.

The monitoring device 100 according to the present disclosure may automatically set the sampling cycle according to whether a failure is generated in the construction equipment to be monitored and according to a type of operation of the construction equipment. The sampling cycle is automatically set as described above, so that it is possible to decrease a possibility in that a user incorrectly determines the sampling cycle, and prevent the inconvenience of directly setting the sampling cycle.

Now, referring to FIG. 3, the method of automatically setting the sampling cycle for the construction equipment by the monitoring device 100 will be described in more detail.

First, the monitoring device 100 determines whether a failure is generated in the construction equipment to be monitored and whether the construction equipment is in a working mode state or a driving mode state (step S310).

In general, the sampling cycle when the failure is generated in the construction equipment needs to be shorter than the sampling cycle when the failure is not generated in the construction equipment for precise diagnosis of the equipment.

A specific method of determining whether the construction equipment is in the working mode state or the driving mode state is different according to a type of construction equipment. For example, in a case where the construction equipment is a wheel loader, when a forward/reverse lever is operated for forward movement or reverse movement and a brake is not stepped on, the construction equipment is determined to be in a driving mode state, and when a value of a front (a boom and a bucket) pressure sensor or a value of a voltage of a front related electronic joystick is equal to or larger than a predetermined value, the construction equipment is determined to be in a working mode state.

For example, in a case where the construction equipment is an excavator, when a driving motor is operated and a brake is not stepped on, the construction equipment is determined to be in a driving mode state, and when a value of a front (a boom, an arm, and a bucket) pressure sensor or a value of a voltage of a front related electronic joystick is equal to or larger than a predetermined value, the construction equipment is determined to be in a working mode state. When the construction equipment is determined to be in the operational states of both the working mode and the driving mode, the construction equipment is determined to correspond to the working mode.

The sampling cycle is differently set according to whether the failure is generated in the construction equipment and the particular operational state of the work mode or the driving mode determined in step S310 (step S320).

In general, differently from a general vehicle which is only in the driving mode state, the construction equipment has the working mode state for operating the boom, the arm, the bucket, and the like, and when the working mode is monitored, the sampling cycle of the monitoring data needs to be further departmentalized. For example, when a working cycle of a device for performing a vehicle driving-related control, such as a gear shift of the construction equipment, is 200, a working cycle of a device for performing a control related to the front working device, such as the boom, the arm, the bucket, and the joystick, is short, that is, 5ms to 10 ms.

In the meantime, a method of setting the sampling cycle according to each condition by a combination of whether the failure is generated in the construction equipment, the working mode, and the driving mode will be described below.

The condition by the combination may be classified into a "failure/working mode" representing that the construction equipment to be monitored is in a failure generation state and simultaneously corresponds to the working mode, a "non-failure/working mode" representing that the construction equipment is in a non-failure generation state and simultaneously corresponds to the working mode, a "failure/driving mode" representing that the construction equipment is in a failure generation state and simultaneously corresponds to the driving mode, and a "non-failure/driving mode" representing that the construction equipment is in a non-failure generation state and simultaneously corresponds to the driving mode.

The sampling cycles for the respective classified conditions are set with different lengths. Specifically, the lengths of the sampling cycles may be set to be increased in an order of the "failure/working mode", the "non-failure/working mode", the "failure/driving mode", and the "non-failure/driving mode".

For example, when the length of the sampling cycle may be 20 ms in a case of the "failure/working mode", 50 ms in a case of the "non-failure/working mode", 100 ms in a case of the "failure/driving mode", and 200 ms in a case of the "non-failure/driving mode".

In the meantime, the sampling cycle for each condition by the combination of whether the failure is generated in the construction equipment, the working mode, and the driving mode may be adjusted according to necessity.

Next, whether the monitoring data for the construction equipment to be monitored is generated by a separate control device, not by the monitoring device 100 is determined (step S330).

When the monitoring data is not generated by the separate control device, the set sampling cycle is applied without a change (step S360).

However, when the monitoring data is generated by the separate control device, for example, the monitoring data is the sampling data generated by a separate control device, such as an engine control unit (ECU), a transmission control unit (TCU, in a case of a wheel loader), and an electric steering control device (in a case of a wheel loader) and stored, whether the set sampling cycle is shorter than a vehicle communication transmission cycle is identified (step S340). The reason is that because a data transmission cycle set by a protocol of vehicle communication (for example, CAN) is already present, it is impossible to more precisely sample the data, compared to the transmission cycle.

When the set sampling cycle is shorter than the vehicle communication transmission cycle, the vehicle communication transmission cycle is set as the sampling cycle (step S350), and when the set sampling cycle is longer than the vehicle communication transmission cycle, the set cycle is applied without a change.

Although the present disclosure has been described with reference to exemplary and preferred embodiments, workers skilled in the art will recognize that changes may be made in form and detail without departing from the spirit and scope of the disclosure.

The invention claimed is:

1. A method of sampling monitoring data of construction equipment, comprising:

setting, by a monitoring device, a set sampling cycle of the monitoring data of the construction equipment when the construction equipment enters into an operation;

sampling, by the monitoring device, the monitoring data of the construction equipment according to the set sampling cycle when a sampling start is input to obtain sampled data, wherein the set sampling cycle is automatically set according to an operational state of the construction equipment including a failure/working mode representing that the construction equipment is in a failure generation state and simultaneously in a working mode of operation, a non-failure/working mode representing that the construction equipment is in a non-failure generation state and simultaneously in the working mode of operation, a failure/driving mode representing that the construction equipment is in the failure generation state and simultaneously in a driving mode of operation, and a non-failure/driving mode representing that the construction equipment is in the non-failure generation state and simultaneously in the driving mode of operation;

storing, by the monitoring device, the sampled data and transmitting the set sampling cycle, a total sampling time and consecutive sampling data to a remote management server when the total sampling time elapses, and consecutively displaying the consecutive sampling data on a display device, in accordance with the set sampling cycle and total sampling time, by the remote management server, and comparing the set sampling cycle and a vehicle communication transmission cycle of the construction equipment when the monitoring data of the construction equipment is generated in a separate control device, wherein when the set sampling cycle is shorter than the vehicle communication transmission cycle, the vehicle communication transmission cycle is applied as the sampling cycle, and when the set sampling cycle is longer than the vehicle communication transmission cycle, the set sampling cycle is applied as the sampling cycle.

2. The method of claim 1, further comprising:
determining whether a sampling end is input,
wherein when the sampling end is input, data sampled to a time point at which the sampling end is input is stored, and the consecutive sampling data is transmitted to the remote management server.

3. The method of claim 1, wherein the sampling cycle is increased in an order of the failure/working mode, the non-failure/working mode, the failure/driving mode, and the non-failure/driving mode.

4. The method of claim 1, wherein when the construction equipment simultaneously performs working and driving, the operational state of the construction equipment is determined as a working mode.

\* \* \* \* \*